United States Patent [19]
Sarbacher

[11] 3,778,632
[45] Dec. 11, 1973

[54] EMERGENCY STARTING POWER FOR ENGINES

[75] Inventor: Robert I. Sarbacher, Santa Monica, Calif.

[73] Assignee: John C. Bogne, Santa Monica, Calif.

[22] Filed: Sept. 14, 1971

[21] Appl. No.: 180,331

[52] U.S. Cl.............. 290/50, 290/37, 290/38, 307/48, 136/181
[51] Int. Cl............................................. F02n 11/14
[58] Field of Search................ 290/50, 38, 37; 136/181; 207/48

[56] References Cited
UNITED STATES PATENTS

| 3,200,014 | 8/1965 | Roberts | 290/50 |
| 3,504,262 | 3/1970 | Sada et al. | 290/50 |
| 3,174,048 | 3/1965 | Snyder | 290/50 |
| 1,924,959 | 8/1933 | Patterson | 290/50 |
| 3,340,402 | 9/1967 | Curtis | 290/50 |
| 2,730,581 | 1/1956 | Bruno | 290/38 |
| 2,761,978 | 9/1956 | Plumi | 290/38 |

*Primary Examiner*—G. R. Simmons
*Attorney*—Fred L. Witherspoon et al.

[57] ABSTRACT

An emergency power system is designed to provide additional battery power for starting engines operating on petroleum products, when the normal battery supply for this purpose has insufficient energy available. The system utilizes either primary reserve cells or dry charged secondary cells for the supplemental power and connects them in such a manner that they can be activated immediately when required.

5 Claims, 4 Drawing Figures

PATENTED DEC 11 1973
3,778,632
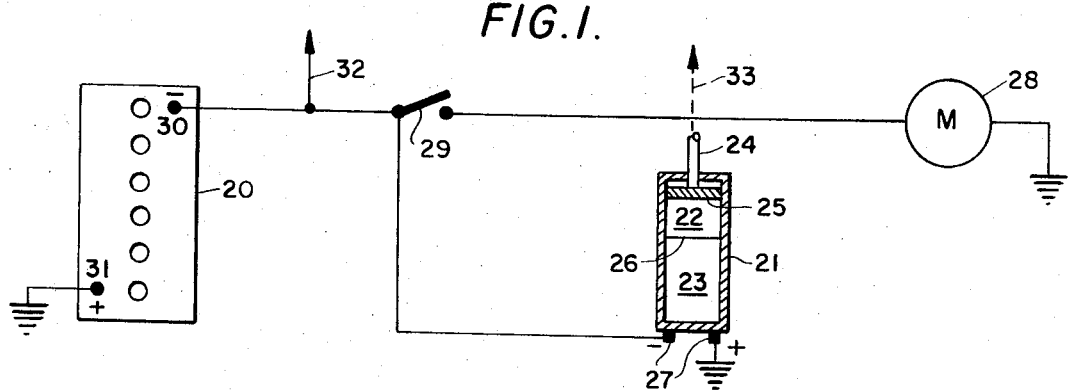
FIG.1.
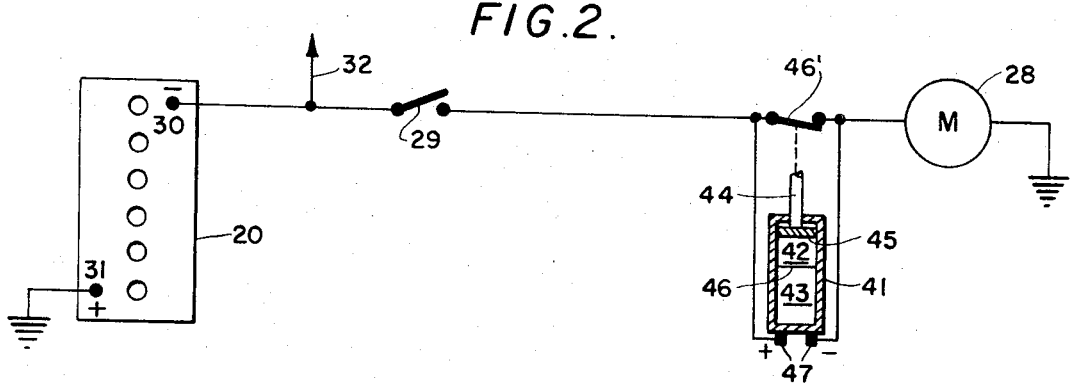
FIG.2.
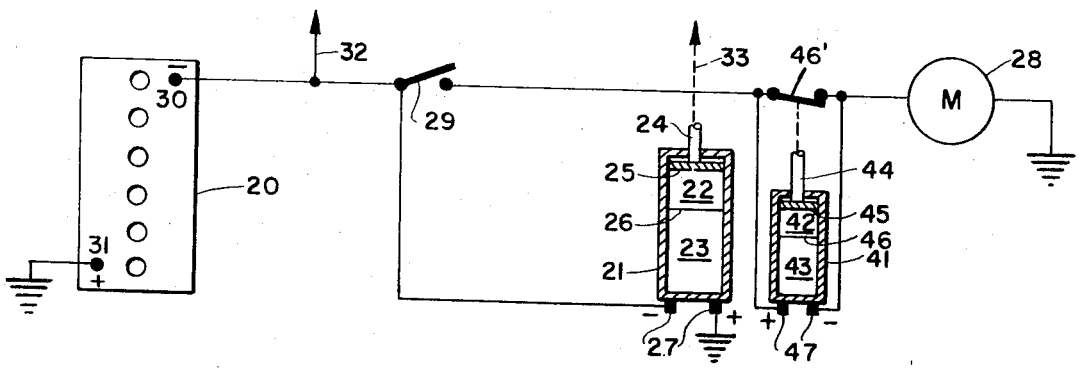
FIG.3.
FIG.4.
INVENTOR
ROBERT I. SARBACHER
BY
ATTORNEY

EMERGENCY STARTING POWER FOR ENGINES

BACKGROUND OF THE INVENTION

There are numerous occasions when the normal battery power supply in an automobile, boat, airplane and the like is unable to provide the power necessary to start the engine. Under many such circumstances the extra energy necessary to start the engine may be only a fraction of that which is available in the normal battery power supply. Thus, supplimentary power requirements may be less than one third the power available from the normal supply. Such occasions arise in very cold weather, for example. This is usually due to two factors. First, all electrochemical batteries lose power when operated in very cold weather. Second, the viscosity of the lubricants in the engine is such that more energy than normal is required to start the engine in cold weather. It is the purpose of this invention to provide the additional energy necessary on such and other occasions by actuating the supplemental reserve battery or batteries and providing the necessary circuitry to connect them into the existing electrical system in such a manner as to employ them most efficiently and effectively. Systems in which a reserve battery is connected into the electrical system in place of the regular battery to start an automobile engine, as well as a system which provides connection for a booster battery, are known in the art. This invention provides for the parallel connection of a supplementary battery and in addition for the series connection of an additional supplementary battery if required. These supplementary batteries are of the type well known in the art, which have better low temperature characteristics than the popular lead-acid batteries most regularly used as a battery power supply for applications of the kind discussed here.

SUMMARY OF THE INVENTION

The present invention relates to the use of primary reserve cells and to dry charged secondary cells, capable of delivering very high current and energy per unit weight and volume. Such batteries are well known in the art. They are batteries wherein the electrodes are fully assembled for operation, but the electrolyte is held in reserve in a separate container which may be within the battery housing. Since there is no consumption of the electrodes under the circumstances, the shelf life of these batteries is essentially infinite. However, once the electrolyte is released from its reserve container such as by mechanical rupture, explosive squib rupture or by any other means as are well known in the art, the battery is activated, and thereafter has a limited standby life.

In accordance with the present invention, reserve batteries may be connected in parallel with the normal lead-acid battery to supply the required extra power to start the engine. When required, it is activated by either of the means cited above. The position of the actuating button may be located in any convenient place and protected from accidential activation by a protective covering as, in the case of an automobile, in the glove compartment which may be locked.

Batteries of the reserve type have very high internal impedance when unactivated, so that they may remain connected in parallel with the normal electrical power supply of the engine without in any way interfering with its ordinary function, and without causing any electrical drain.

In addition to the parallel connection described above, an additional supplementary reserve battery may be connected in series with the normal electrical power supply for the engine starting. When activated, a switch is simultaneously opened connecting the reserve battery in series with the normal battery adding extra power to the system to start the engine.

Since the object of this invention is to supply supplementary power to the standard electrical power supply of the engine's starting equipment, and not to replace it, the operation of this invention is dependent upon the power available in the system and is not applicable to engines having a completely exhausted power supply. Thus the energy to activate a squib, being very small indeed, is available, if this form of activation is used.

In order to avoid electrical power losses in the wires connecting the supplementary battery or batteries to the starter motor, it is desirable to mount the reserve cells on a bracket attached directly on the engine's starter motor. This is made possible due to the small size of the supplementary reserve cells.

Other objects and advantages of the present invention will become apparent to those skilled in the art from a consideration of the following detailed description of the invention, when read in conjunction with the accompanying drawings.

BRIEF DESCRIPTION OF THE DRAWINGS

FIG. 1 is a schematic diagram illustrating a parallel connection of the supplementary reserve battery.

FIG. 2 is a schematic diagram illustrating a series connection of a supplementary reserve battery.

FIG. 3 is a schematic diagram illustrating both a series and parallel connection of the supplementary reserve batteries.

FIG. 4 shows apparatus for detachably mounting the reserve battery to the starter motor housing.

DETAILED DESCRIPTION OF THE INVENTION

A storage battery, reserve battery or batteries and motor are shown in FIG. 1, FIG. 2 and FIG. 3. These are only schematically represented, because various structures therefor are well known in the art and the details thereof are not material to the present invention. The storage battery 20, FIG. 1, is the common lead-acid electrochemical battery such as used in automobiles. The reserve battery 21 may be a reserve primary electrochemical battery with an electrolyte compartment 22 and an electrode compartment 23. This battery contains a piston rod 24 and piston 25. When the rod 24 is depressed, the piston 25 forces the electrolyte contained in the compartment 22 into the electrode compartment 23 by breaking the thin diaphragm 26 and thus energizing the battery. One of the battery terminals 27, the positive terminal is connected to the ground, the negative terminal to the starter switch 29 as indicated in FIG. 1. The negative terminal 30 of the storage battery 20 is also connected at the same point on the starter switch 29 and the positive terminal 31 of this battery is connected to the ground. The arrow 32 indicates a main power lead to auxiliary equipment not concerned with this invention. The connections described above effectively place the reserve battery 21 in parallel with the storage battery 20. When an emergency arises wherein the battery 20 does not have sufficient power to start the engine by energizing the motor 28, the piston rod 24 is depressed, activating the reserve battery 21 whose power is then available to supplement the power available in the storage battery 20. The depression of the piston rod may be effected through a mechanical linkage 33, or through the use of an explosive squib or any other means as is well known in the art. By the addition of this extra power, when the starter switch 29 is closed again, there is sufficient energy available to the motor 28 to start the engine. When the reserve battery 21 is installed in the circuit, and before it is activated, its internal impedance is so high that it causes no drain on the storage battery 20 and can therefore remain in parallel with this battery 20 indefinitely. Once it is activated, however, it will retain its energy a limited time so that it should be removed at the first convenience, and replaced with a new unactivated battery.

It is for this reason that arrangements should be made to provide a "plug in" receptacle for this battery whereby it may be readily removed and replaced when the occasion arises. Because the reserve battery 21 is physically much smaller than the storage battery 20, a bracket to hold it can be located directly on the motor housing 28, as shown in FIG. 4. In FIG. 4, a pair of brackets 50 and 51 are mounted on starter motor 28. These brackets may be mounted by any suitable means but, as will be apparent, bracket 51 must be electrically insulated from the metal housing of starter motor 28. Bracket 50 is "U" shaped with the legs 52 and 54 of the "U" extending away from the surface of motor 28. Similarly, bracket 51 is "U" shaped with the legs 53 and 55 of the "U" extending away from the surface of motor 28. Battery 21 is slipped into brackets 50 and 51 and held in place by means of the legs 52, 54, 53 and 55. The brackets would normally be made of a spring metal so that battery 21 is actually clipped into the brackets and held firmly in place. Of course, a strap or any other suitable means (not shown) could also be added to prevent accidental dislodging of battery 21 or dislodging due to vibration. Legs 55 and 52 in addition to providing spring clips also provide contact points for terminal 27 of battery 21. The ungrounded terminal 27 is shown associated with leg 55 and the grounded terminal is associated with leg 52. As was mentioned above and is now obvious, bracket 51 must be electrically insulated from the housing of motor 28. If the brackets are made of spring steel or of any other poor conductor, contact points of copper or other suitable material would be fabricated on legs 55 and 52 and the electrical leads would be connected to these contact points. from the foregoing it is obvious that the battery 21 can be readily snapped in place or removed. In addition to ease of placement and removal, a bracket assembly mounted on motor 28 as shown in FIG. 4 places battery 21 close to the load, thereby reducing the voltage drop in the leads and increasing the efficiency of the system. While a particular bracket arrangement has been shown in FIG. 4, it will be obvious to those skilled in the art that other similar holding and contact assemblies could be utilized and that additional batteries could be mounted on motor 28 by providing additional brackets.

If instead of using a primary reserve battery 21, a dry charged battery is used, it may remain in the circuit indefinitely since it will be charged at the same time the battery 20 is charged during the operation of the engine, thus providing at all times extra energy for example, during a severe cold period.

A series arrangement of a primary reserve battery 41, a storage battery 20 and a motor 28 are shown in FIG. 2. Under normal operating conditions when the starter switch is closed, the power available form the battery 20 is sufficient to energize the motor 28 and start the engine. On the occasion where the battery 20 does not have sufficient power available, the switch 46, which normally remains closed as shown in FIG. 2, is opened, and simultaneously the rod 44 is depressed. This forces the piston 45 against the incompressable electrolyte contained in battery compartment 42 which breaks the diaphragm 46 and permits the electrolyte to enter the battery electrode compartment 42 thus energizing the reserve cell 41. The terminal 47 of the reserve battery 41 are connected to each side of the switch 46' with the polarity indicated. The energized reserve battery 41 is now connected in series with the storage battery 20 adding the supplementary power necessary to properly energize the motor 28 and start the engine attached thereto.

After the engine has started, the battery 41 may be replaced and the switch 46 closed again to be ready for the next emergency use.

A series and parallel arrangement of a storage battery 20 with two reserve batteries 21 and 41, and a motor 28 are shown in FIG. 3. The operation of this system is the same as described above for the parallel arrangement of FIG. 1 and the series arrangement of FIG. 2. The advantage of the use of both systems together is of course the extra supplementary power that is made available. Another advantage of this sustem is the fact that if only one reserve battery is used to start the engine, the second battery is held in reserve if an additional emergency starting is required before it is convenient to replace the reserve batteries.

Many modifications and variations of the illustrated embodiment of this invention will be apparent to those skilled in the art. Accordingly, such variations and modifications as are embraced by the spirit and scope of the appended claims are considered to be within the purview of the present invention.

What is claimed is:

1. In combination with an engine primary power supply and starter motor, a supplemental power supply comprising:
   a. a normally inactive reserve battery;
   b. means to connect said reserve battery in series with said primary power supply when said reserve battery is activated to supplement the power of said primary power supply;
   c. means to activate said normally inactive reserve battery; and
   d. switch means that is closed to short out said reserve battery when said reserve battery is inactive, and is opened when said reserve battery is activated, whereby said reserve battery when activated provides power to assist in the starting of said engine when said primary power supply does not have sufficient energy to start said engine.

2. The combination as defined in claim 1 wherein battery clips are mounted on said starter motor to detachably mount said reserve battery on said starter motor.

3. The combination as defined in claim 2 wherein a second reserve battery is connected directly in parallel with said primary power supply during both its active and inactive states, and wherein means are provided to activate said second reserve battery.

4. The combination as defined in claim 3 wherein additional battery clips are mounted on said starter motor to detachably mount said second reserve battery on said starter motor.

5. The combination as defined in claim 4 wherein said means to activate said reserve battery are located remote from said reserve battery and said means to activate said second reserve battery are also located remote from said second reserve battery.

* * * * *